United States Patent

Miyachi

[11] Patent Number: 5,253,733
[45] Date of Patent: Oct. 19, 1993

[54] OIL AND AIR LUBRICATION DEVICE

[75] Inventor: Takeshi Miyachi, Osaka, Japan

[73] Assignee: Koyo Seiko Co., Ltd., Osaka, Japan

[21] Appl. No.: 931,329

[22] Filed: Aug. 18, 1992

[30] Foreign Application Priority Data

| Aug. 20, 1991 | [JP] | Japan | 3-207989 |
| Dec. 25, 1991 | [JP] | Japan | 3-343035 |
| Jun. 26, 1992 | [JP] | Japan | 4-169245 |

[51] Int. Cl.$^5$ .................................................. F01M 1/00
[52] U.S. Cl. .................................. 184/6.26; 184/7.4; 184/8; 184/55.1; 184/55.2; 137/561 A; 384/474
[58] Field of Search ............... 184/6.26, 8, 55.1, 55.2, 184/11.1, 11.2, 7.4; 137/98, 99, 101.1, 561 A; 384/466, 467, 473, 474

[56] References Cited

U.S. PATENT DOCUMENTS

| 2,855,250 | 10/1958 | Peycke | 384/474 |
| 3,085,838 | 4/1963 | Patterson | 384/466 |
| 5,007,504 | 4/1990 | Hallbach | 184/8 |
| 5,156,642 | 10/1992 | Lopez | 137/561 A |

FOREIGN PATENT DOCUMENTS

| 0010269B1 | 5/1982 | European Pat. Off. |
| 63-123657 | 5/1988 | Japan |
| 94789 | 2/1939 | Sweden | 384/474 |
| 0444496 | 3/1936 | United Kingdom | 384/473 |

Primary Examiner—Thomas E. Denion
Attorney, Agent, or Firm—Mason, Fenwick & Lawrence

[57] ABSTRACT

In order to appropriately distribute a lubricating oil of high viscosity to lubrication points through a simple construction in oil and air lubrication, in a preferred embodiment of the present invention, three distributors 8, 9 and 10 are provided between oil feed passages 7, the most downstream one of which is connected at the downstream end of the passage to a fourth branch passage 14. Quantities of the lubricating oil are passed through the holes A, B and C of the first distributor 8, those E and F of the second distributor 9 and that H of the third distributor 10. Other quantities of the oil, which are nearly equal to each other, are sent to three lubrication points through the other holes D, G and I of the distributors 8, 9 and 10 and a first, a second and a third branch passages 11, 12 and 13. The three lubrication points are a point at contact-type oil seals 5, and two points in a four-train conical roller bearing 3. The oil flowing through the oil feed passage 7 downstream of the third distributor 10 is all sent to the other lubrication point at contact-type oil seals 6 through the fourth branch passage 14.

2 Claims, 8 Drawing Sheets

OIL AND AIR LUBRICATION DEVICE

BACKGROUND OF THE INVENTION

The present invention relates to an oil and air lubrication device which distributes an oil to a plurality of lubrication points through a plurality of branch passages as the oil is sent by air from an oil source along the peripheral surface of a single oil feed passage line.

Oil and air lubrication has advantages that the required quantity of an oil is less than that in oil mist lubrication, and the oil does not leak and contaminate the environment. For example, the oil and air lubrication is performed to send the oil to lubrication points at the trains of a multi-train bearing such as the roll end portion support bearing of a rolling machine. For that purpose, a single oil feed passage line having oil feed passages gradually different from each other in diameter depending on the number of the lubrication points is provided to send the oil from the oil feed passages to the lubrication points through branch passages extending in the radial directions of the oil feed passages, as described in the Japan Patent Application (OPI) No. 123657/88 (the term "OPI" as used herein means an "unexamined published application").

The rolling machine requires a lubricating oil of high viscosity. However, if such an oil of high viscosity is used in the above-described conventional manner of performing the oil and air lubrication to send the oil to the lubrication points, the oil being send along the peripheral surface of the oil feed passage line does not uniformly flow into the branch passages. For that reason, the lubrication is not performed enough at some lubrication point. Therefore, the conventional manner of performing the oil and air lubrication to send the oil to the lubrication points cannot be adopted for the roll end portion support bearing of the rolling machine, but oil feed passage lines need to be separately provided for the lubrication points, respectively, to send the oil thereto. This results in generating a complicated passage construction, and increasing the cost of processing therefor.

Figure 12:
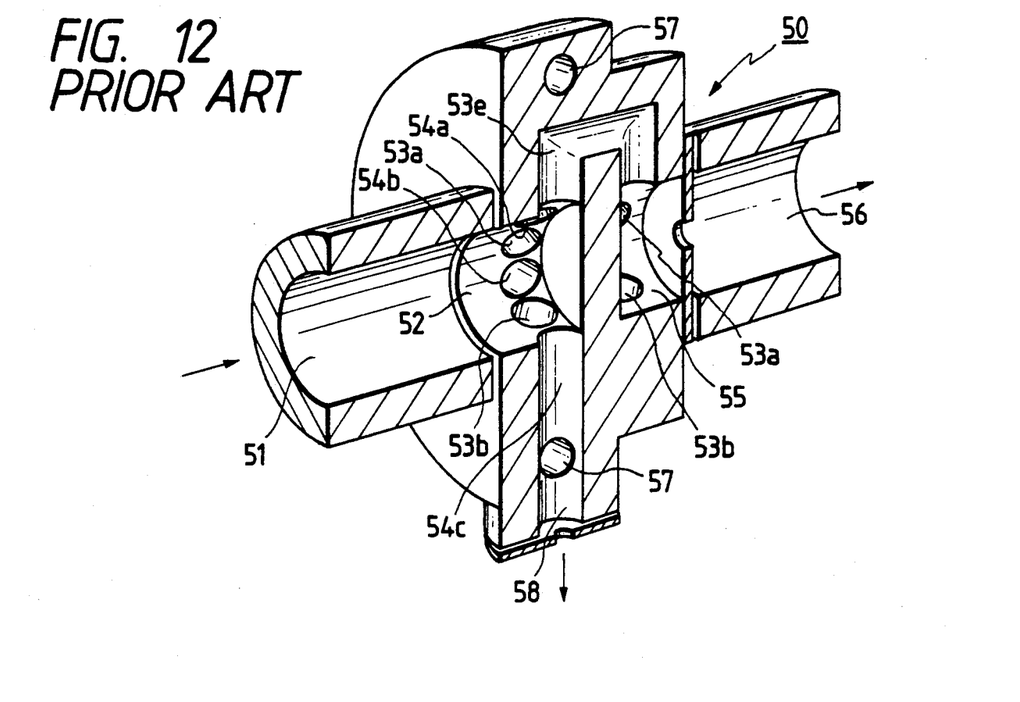
FIG. 12 is a perspective cutaway view of a conventional distribution unit.
Figure 13:
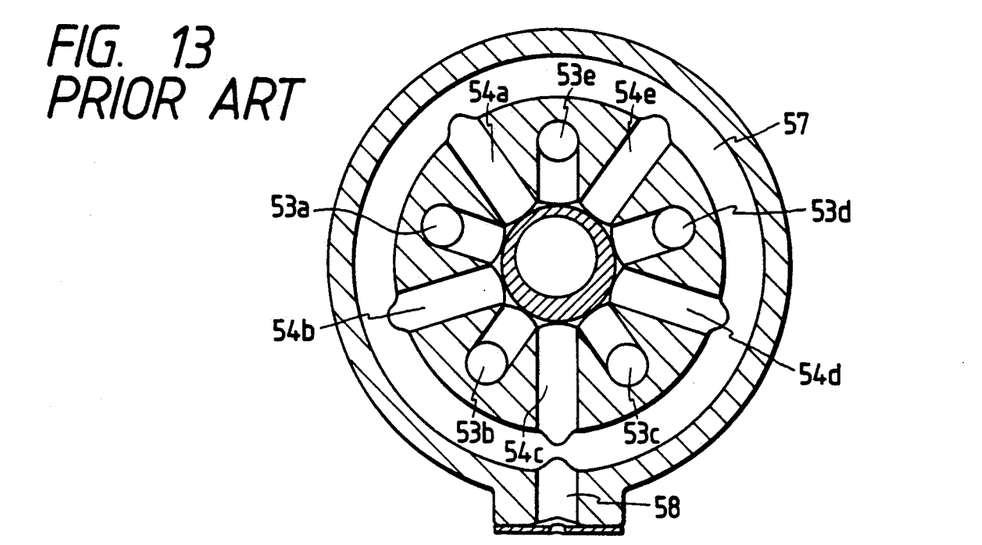
FIG. 13 is a cross-sectional view of the unit.

A distribution unit 50, which is shown in FIGS. 12 and 13 and sends appropriate quantities of an oil to a plurality of lubrication points and passes the rest of the oil to a next plurality of lubrication points as the oil is sent through a single oil feed passage line, was disclosed in the European Patent Publication No. 0 010 269 B1. After the oil is sent into the distribution unit 50 through an inflow passage 51, the oil flows into a large number (ten) intermediate passages 53a, 53b, 53c, 53d, 53e, 54a, 54b, 54c, 54d and 54e opened into the circumferentially spaced portions of the peripheral surface of a passage 52 communicating with the inflow passage. The oil having flowed into the five intermediate passages 53a, 53b, 53c, 53d and 53e undergoes confluence in a confluence passage 55, and is then sent out to the next lubrication points through an outflow passage 56. The oil having flowed into the other five intermediate passages 54a, 54b, 54c, 54d and 54e enters into a confluence passage 58 through an annular passage 57 so as to undergo confluence, and is then sent out to the former lubrication points. The oil and air for sending the oil tend to be larger in quantities on the lower portions of the peripheral surfaces of the inflow passage 51 and the passage 52 than on the upper portions thereof due to gravity. However, the oil and the air can be distributed nearly in a desired manner by the unit 50, regardless of the tendency, because the intermediate passages 53a, 53b, 53c, 53d, 53e, 54a, 54b, 54c, 54d and 54e are distributively opened into the circumferentially spaced portions of the peripheral surface of the passage 52. Although the distribution unit 50 is thus designed not to be adversely affected by gravity, it is troublesome and complicated to perform processing to form the many intermediate passages and the annular passage 57, and it is therefore difficult to manufacture the unit. Besides, if the diameter of each of the intermediate passages is made small, the passage is more likely to be clogged. If the diameter is made large, the entire size of the distribution unit 50 is enlarged.

SUMMARY OF THE INVENTION

The present invention was made in order to solve the problems described above. Accordingly, it is an object of the invention to provide an oil and air lubrication device capable of appropriately distributing an oil to lubrication points through a simple construction even if the oil is high in viscosity.

The device distributes the oil to the plural lubrication points through a plurality of branch passages as the oil is sent by air from an oil source along the peripheral surface of a single oil feed passage line. The device is characterized in that distribution means for sending required quantities of the oil to the lubrication points are provided in the single oil feed passage line so that the means correspond to the branch passages except to that for the most downstream lubrication point; and each of the means has an introducing passage for sending the required quantity of the oil to the lubrication point, and at least one passing passage for passing another required quantity of the oil to the next downstream distribution means.

In the oil and air lubrication device provided in accordance with the present invention, the oil flowing in the single oil feed passage line are distributed by each of the distribution means provided in the line, so that the required quantity of the oil is passed to the downstream distribution means, and the other required quantity of the oil is sent to the lubrication point. In other words, the oil flowing in the line is divided to the former required quantity by the single introducing passage of each distribution means, and to the other required quantity by the at least one passing passage of the means. For that reason, even if the oil is high in viscosity, the appropriate quantities of the oil are sent to the lubrication point through the introducing passages of the distribution means although the device has such a simple construction that the means are only provided in the single oil feed passage line.

DETAILED DESCRIPTION OF THE PREFERRED EMBODIMENTS

Embodiments of the present invention are hereafter described in details with reference to the drawings attached hereto.

FIGS. 1, 2, 3 and 4 indicates an oil and air lubrication device which is one of the embodiments. FIGS. 1, 2, 3 and 4 show a rotary shaft 1 corresponding to the end portion of the roll of a rolling machine, a housing 2 corresponding to a bearing box for the end portion of the roll, a four-train conical roller bearing 3, contact-type oil seals 5 and 6, and oil feed passage line made of four oil feed passages 7, a first distributor 8, a second distributor 9, a third distributor 10, a first branch passage 11, a second branch passage 12, a third branch passage 13, and a fourth branch passage 14.

The oil and air lubrication device includes the oil feed passages 7, the distributors 8, 9 and 10, and the branch passages 11, 12, 13 and 14. The device feeds a lubricating oil to four lubrication points through the oil feed passages 7, the distributors 8, 9 and 10 and the branch passages 11, 12, 13 and 14. The four lubrication points are two points in the four-train conical roller bearing 3, a point at the contact portions of the contact-type oil seals 5, and a point at the contact portions of the other contact-type oil seals 6.

Figure 1:
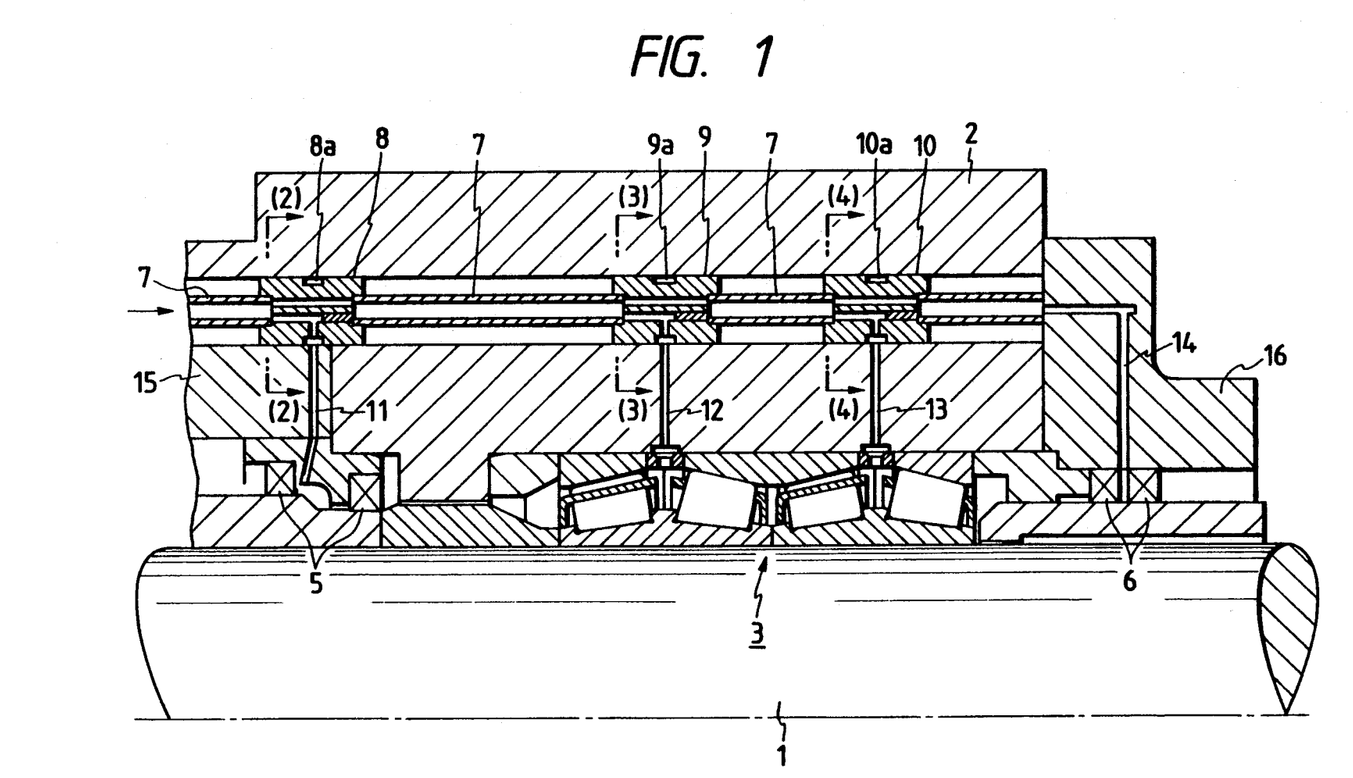
FIG. 1 is a longitudinally sectional view of the upper half of an oil and air lubrication device which is an embodiment of the present invention.

The oil feed passages 7 are constituted by four cylindrical pipes separated from each other by the three nearly-cylindrical distributors 8, 9 and 10 in the longitudinal direction of the housing 2.

The first distributor 8 sends a prescribed quantity of the oil to the lubrication point at the oil seals 5 through the first branch passage 11 formed in a collar 15. The second distributor 9 sends a prescribed quantity of the oil to one of the two lubrication points in the four-train conical roller bearing 3 through the second branch passage 12 formed in the housing 2. The lubrication point to which the oil is sent by the second distributor 9 is located between the first and second trains of the conical rollers of the bearing 3. The third distributor 10 sends a prescribed quantity of the oil to the other of the two lubrication points in the bearing 3 through the third branch passage 13 formed in the housing 2. The lubrication point to which the oil is sent by the third distributor 10 is located between the third and fourth trains of the conical rollers of the bearing 3. The most downstream oil feed passage 7 communicates at the downstream end thereof with the fourth branch passage 14 formed in a cover 16, so that the oil having lowed through the third distributor 10 except that sent to the latter lubrication point in the bearing 3 is sent to the lubrication point at the other oil seals 6 through the most down-stream oil feed passage and the fourth branch passage.

Figure 2:
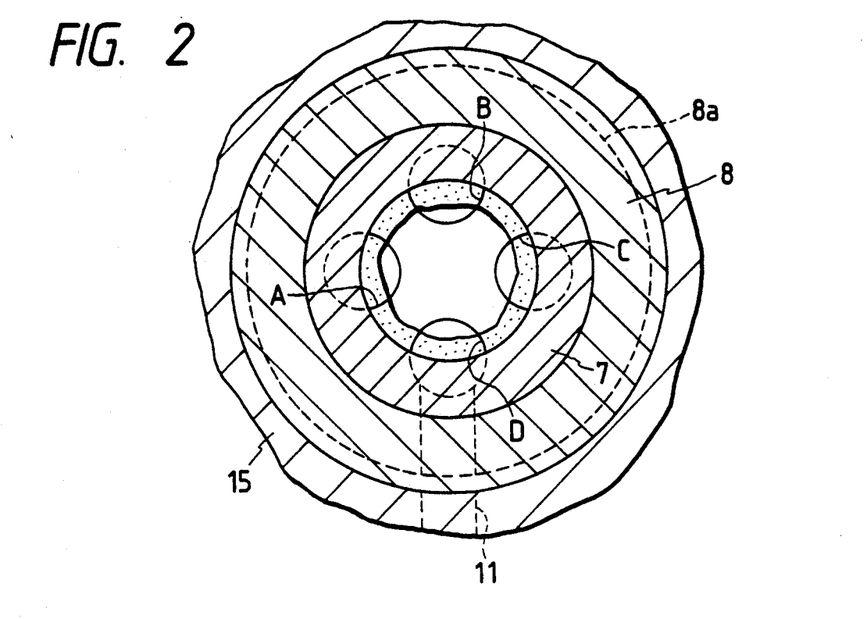
FIG. 2 is a cross-sectional view of the device along II—II line shown in FIG. 1.
Figure 3:
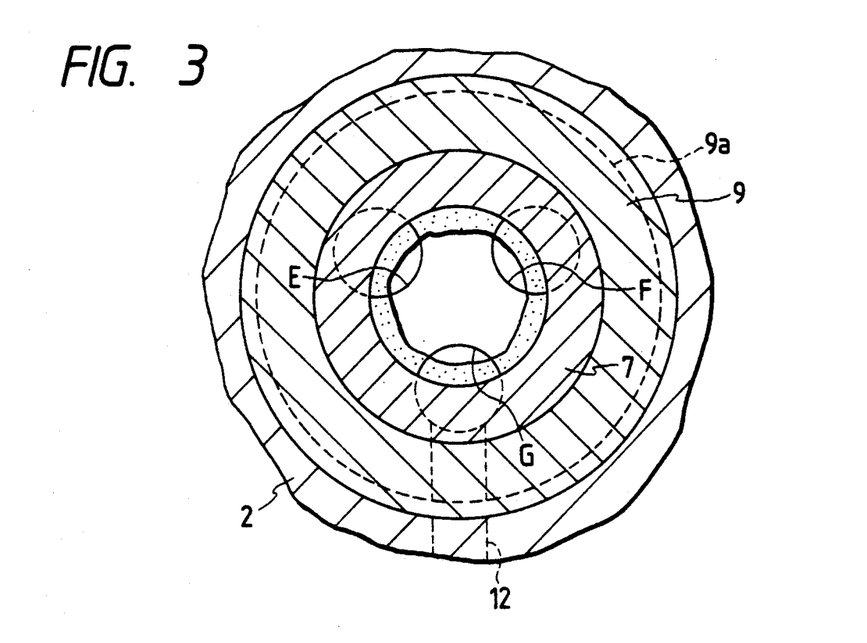
FIG. 3 is a cross-sectional view of the device along III—III line shown in FIG. 1.
Figure 4:
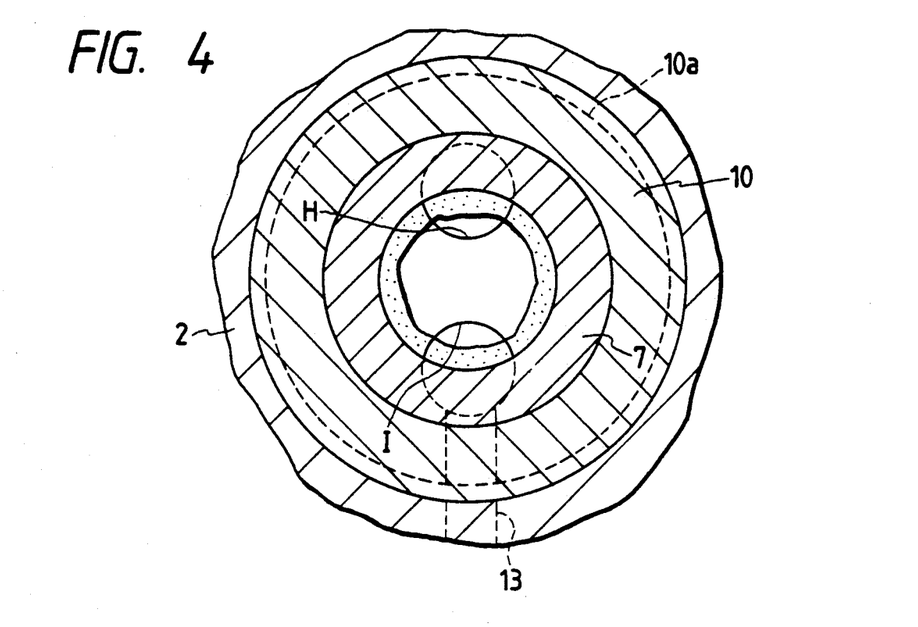
FIG. 4 is a cross-sectional view of the device along IV-IV line shown in FIG. 1.

The first distributor 8 has four holes A, B, C and D equal to each other in diameter, as shown in FIG. 2. The second distributor 9 has three holes, E, F and G equal to each other in diameter, as shown in FIG. 3. The third distributor 10 has two holes H and I equal to each other in diameter, as shown in FIG. 4. The three holes A, B and C of the first distributor 8, the two holes E and F of the second distributor 9 and the one hole H of the third distributor 8 entirely extend straight along the axes of the distributors so that the oil is passed downstream through the holes as the oil flows through the oil feed passages 7. The holes D, G and I of these three distributors 8, 9 and 10 are closed at the downstream halves of the holes by plugs, and rectangularly bent so that the holes are opened into the circumferential grooves 8a, 9a and 10a of the outer circumferential surfaces of the distributors, respectively.

About three quarters of the oil flowing through the oil feed passage 7 immediately upstream of the first distributor 8 are passed through the three holes A, B and C thereof into the next downstream oil feed passage 7, and about one quarter of the oil is passed through the other hole D of the distributor into the first branch passage 11. About two-thirds of the oil flowing through the oil feed passage 7 immediately upstream of the second distributor 9 are passed through the two holes E and F thereof into the next downstream oil feed passage 7, and about one-third of the oil is passed through the other hole G of the distributor into the second branch passage 12. About a half of the oil flowing through the oil feed passage 7 immediately upstream of the third distributor 10 is passed through the hole H thereof into the next downstream oil feed passage 7, and about another half of the oil is passed through the other hole I of the distributor into the third branch passage 13.

The center of each of the holes A, B, C, D, E, F, G, H and I is located at the peripheral surface of the oil feed passage 7 adjacent to the hole. Nearly a half of the cross section of each of the holes communicates with the oil feed passage adjacent to the hole. The diameter of each of the holes A, B, C and D is not larger than that of each of the holes E, F and G, which is not larger than that of each of the holes H and I. The diameter of the oil feed passage line is present so that the half of the cross section of each of the holes A, B, C, D, E, F, G, H and I overlaps with the oil feed passage 7 adjacent to the hole. The diameters of the four branch passages 11, 12, 13 and 14 can be optionally present to alter the quantities of the oil for the lubrication points.

The holes A, B and C of the first distributor 8, those E and F of the second distributor 9 and that H of the third distributor 10 correspond to the passing passage mentioned in the claim. The hole D of the first distributor 8, that G of the second distributor 9 and that I of the third distributor 10 correspond to the introducing passage mentioned in the claim.

The operation of the oil and air lubrication device is described in detail from now on. The lubricating oil and air for sending the oil are sent into the oil feed passage line from an oil source not shown in the drawings. About three quarters of the oil flowing through the oil feed passage 7 immediately upstream of the first distributor 8 are passed through the holes A, B and C thereof into the next downstream oil feed passage 7, and about one quarter of the oil is passed through the other hole D of the distributor and the first branch passage 11 to the lubrication point at the contact-type oil seals 5. About two-thirds of the oil flowing through the oil feed passage 7 immediately upstream of the second distributor 9 are passed through the holes E and F thereof into the next downstream oil feed passage 7, and about one-third of the oil is passed through the other hole G of the distributor and the second branch passage 12 to the lubrication point located between the first and second trains of the conical rollers of the four-trains conical roller bearing 3. About a half of the oil flowing through the oil feed passage 7 immediately upstream of the third distributor 10 is passed through the hole H thereof into the next downstream oil feed passage 7, and about another half of the oil is passed through the other hole I of the distributor and the third branch passage 13 to the lubrication point located between the third and fourth trains of the conical rollers of the bearing 3. The oil flowing through the oil feed passage 7 downstream of the third distributor 10 is passed through the fourth branch passage 14 to the lubrication point at the other contact-type oil seals 6. Since the peripheral surfaces of the oil feed passages 7 extend in the axial directions of the holes A, B, C, D, E, F, G, H and I of the distributors 8, 9 and 10 except for the portions of the holes, which extend in the radial directions of the distributors, the oil straightly flows into the holes as the oil is sent by the air along the peripheral surfaces of the oil feed passages. For that reason, even if the oil is high in viscosity, it easily flows into the distributors 8, 9 and 10.

Figure 5:
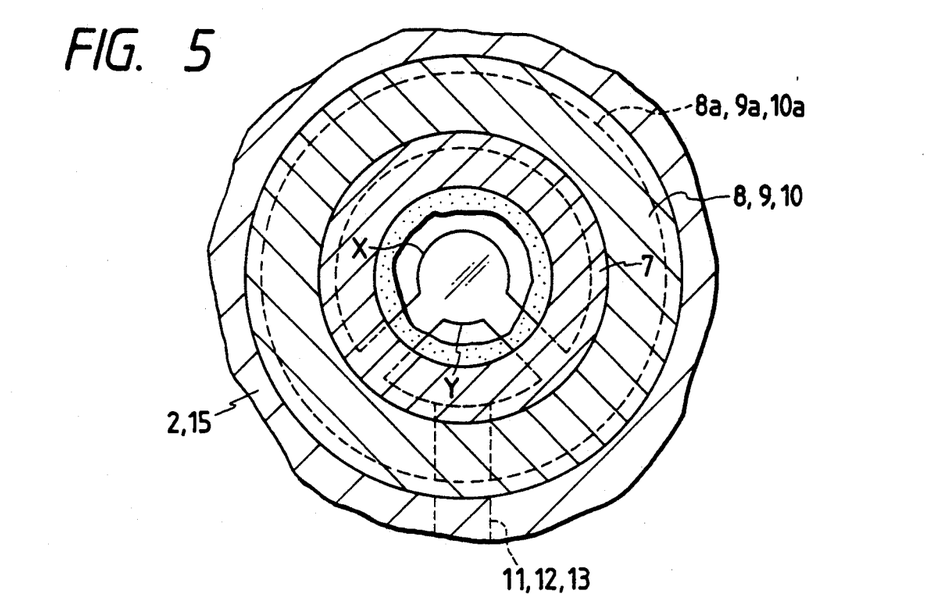
FIG. 5 is a cross-sectional view of the distributor of an oil and air lubrication device which is another embodiment of the invention.
Figure 6:
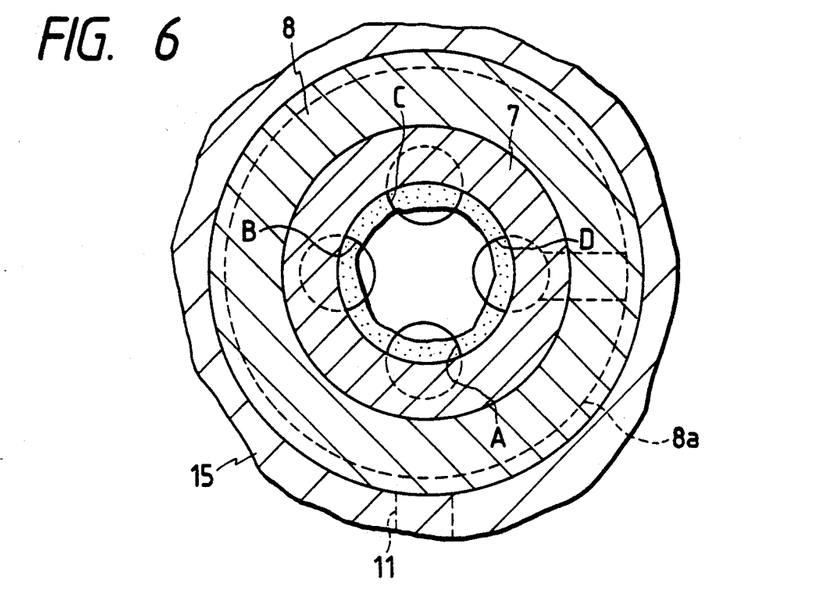
FIG. 6 is a cross-sectional view of a major part of an oil and air lubrication device which is yet another embodiment of the invention.

The present invention is not confined to the abovedescribed embodiment, but may be embodied or practiced in other various ways without departing from the spirit or essential character of the invention. For example, the cross section of each of the holes A, B, C, D, E, F, G, H and I of the distributors 8, 9 and 10 may be sectorially shaped as shown in FIG. 5. If the cross section is sectorially shaped, the holes of each distributor are constituted by a hole X through which the oil is passed from the upstream oil feed passage 7 to the downstream one, and another hole Y through which the oil is sent to the lubrication point. The cross-sectional areas of the holes X and Y may be appropriately present depending on the quantities of the ail which should be passed through the holes. Although the holes D, G and H of the distributors 8, 9 and 10 are located in the lowermost portions thereof, which are located at the branch passages 11, 12 and 13, the holes may be located not in the portions but communicate with the branch passages through the circumferential grooves 8a, 9a and 10a, as shown in FIG. 6. With the latter locating, the angular limitation on the circumferential positions of the distributors 8, 9 and 10 is eliminated to heighten the freedom of fitting thereof in the oil and air lubrication device.

Figure 7:
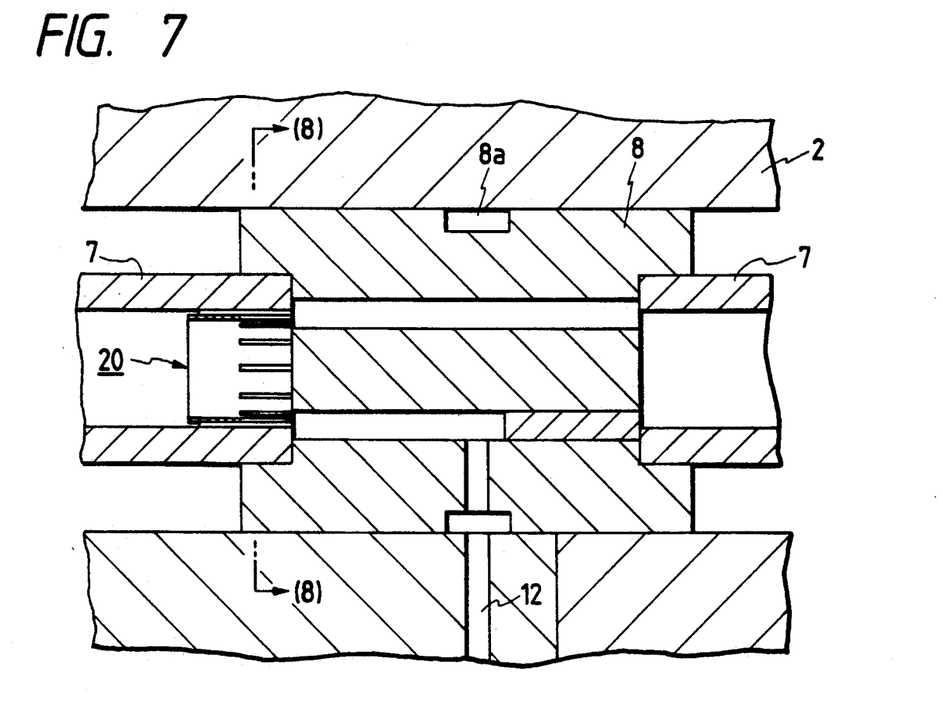
FIG. 7 is a longitudinally sectional view of a major part of an oil and air lubrication device which is yet another embodiment of the invention.
Figure 8:
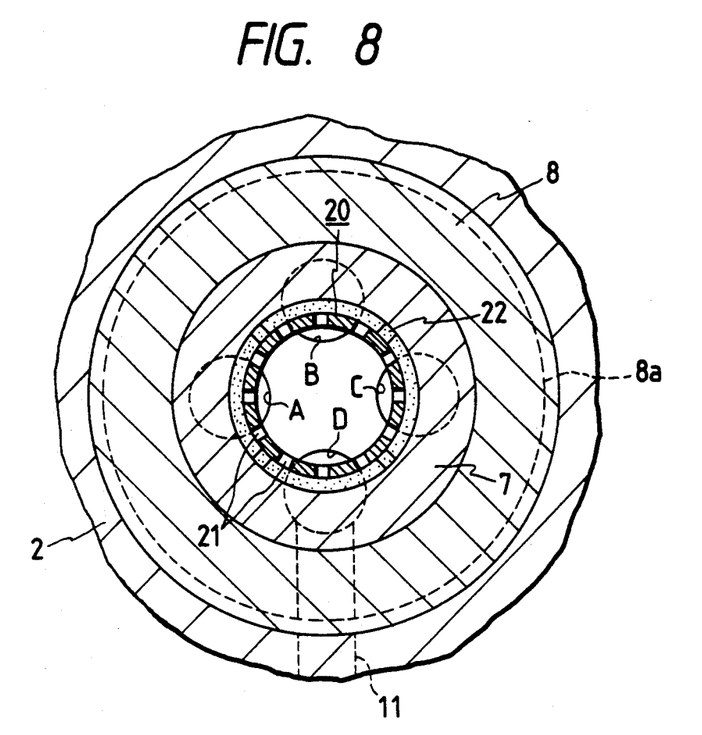
FIG. 8 is a cross-sectional view of the device along VIII—VIII line shown in FIG. 7.
Figure 9:
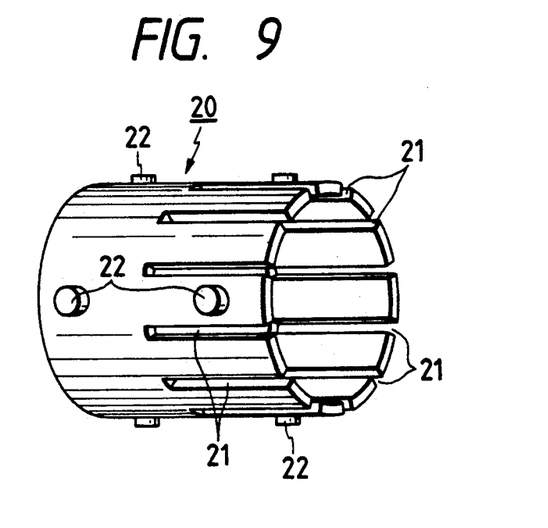
FIG. 9 is a perspective view of the tube of the device shown in FIG. 7.

Besides, tubes 20 may be provided in the oil feed passages 7 at the inlet ends of the distributors 8, 9 and 10, as shown in FIGS. 7 and 8, to equalize the inflow quantities of the oil to the holes of each distributor to each other. As shown in FIG. 9, a longitudinal half of each tube 20 has a number (8 to 30, for example) of slits 21 at intervals in the circumferential direction of the tube, and projections 22 in appropriate positions on the outer circumferential surface of the half so as to form an annular opening between the surface and the peripheral surface of the oil feed passage 7. The outside diameter of each tube 20 is preset in connection with the diameter of the oil feed passage 7 so that the thickness of the annular opening is 0.2 to 0.3 Mm, for example. If even a slight quantity of the oil flows into the annular opening between the tube 20 and the peripheral surface of the oil feed passage 7, the oil spreads in the opening along the circumference thereof due to capillary attraction in the opening to fill it. The pressure of the air, which acts to the oil in the annular opening through the slits 21 of the tube 20, causes the oil to flow to the inlet end of the distributor so that the oil on the peripheral surface of the oil feed passage 7 forms a layer of uniform thickness at the inlet end. For that reason, the mutually equal quantities of the oil flow into the holes of each distributor, which are those A, B, C, and D of the distributor 8, those E, F and G of the distributor 9, and those H and I of the distributor 10. Because of the use of the tube 20, even if the pressure of the air for sending the oil fluctuates or is extremely low, the oil flowing on the peripheral surface of the oil feed passage 7 is prevented from gathering down due to the weight of the oil itself. As a result, the oil can be nearly uniformly sent to the lubrication points.

Figure 10:
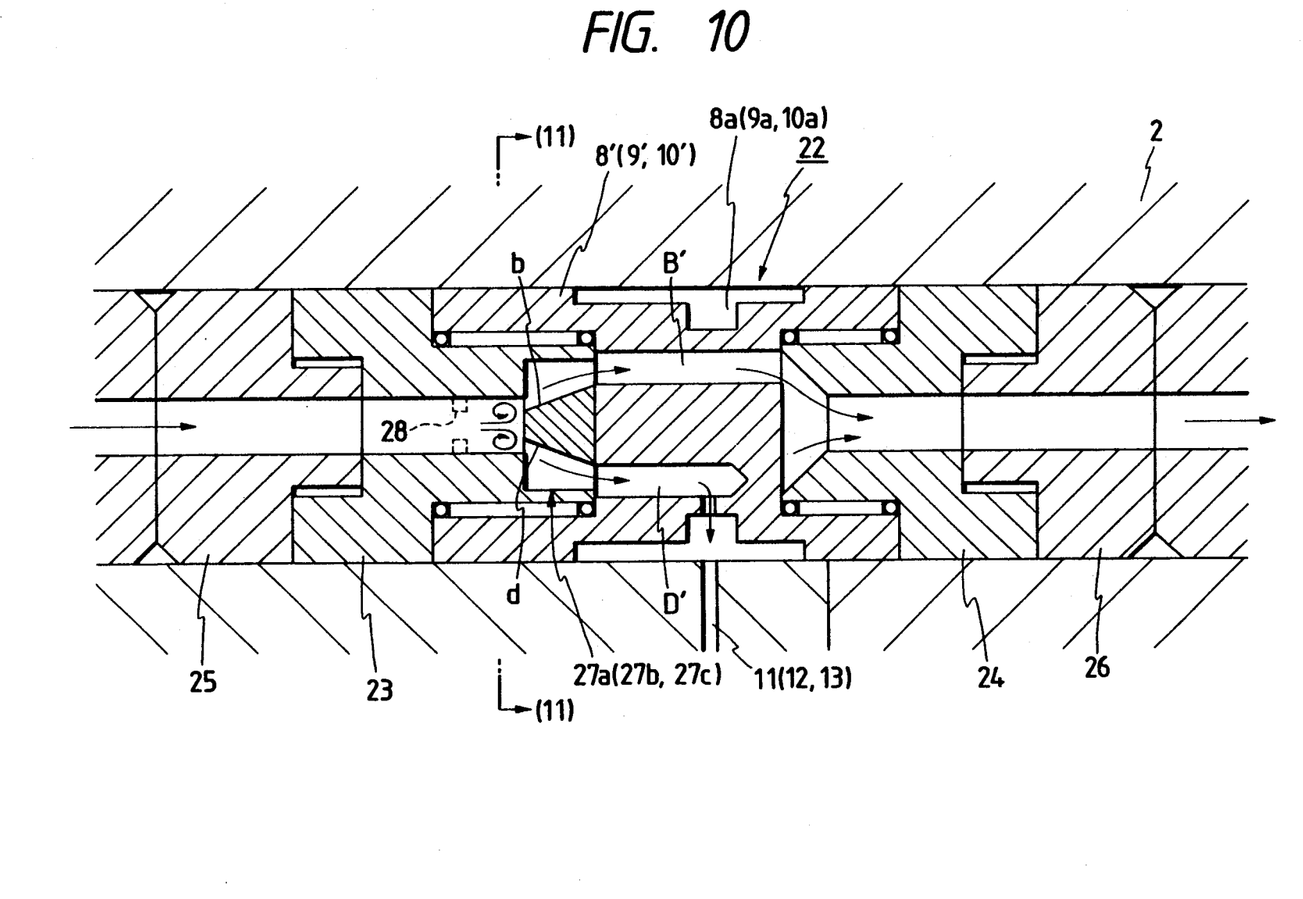
FIG. 10 is a longitudinally sectional view of a major part of an oil and air lubrication device which is yet another embodiment of the invention.

Furthermore, a distribution unit 22 shown in FIGS. 10 and 11 may be provided instead of each distributor 8, 9 or 10 and the oil feed passages 7 extending upstream and downstream of the distributor. The distribution unit 22 is similar to an integral combination of the distributor and the oil feed passages. The unit 22 includes a distribution block 8', 91' or 10' corresponding to the distributor 8, 9 or 10, four oil feed passage blocks 23, 24, 25 and 26 provided at both the ends of the distribution block, and a distribution piece 27a, 27b or 27c integrally combined with the oil feed passage block 23 provided upstream of the distribution block. These blocks 8', 23, 24, 25 and 26 are removably coupled together by screw threads. The axial dimensions of the oil feed passage blocks 25 and 26 provided at both the ends of the distribution unit 22 are appropriately preset depending on the distance between the distributors 8, 9 and 10.

Figure 11A:
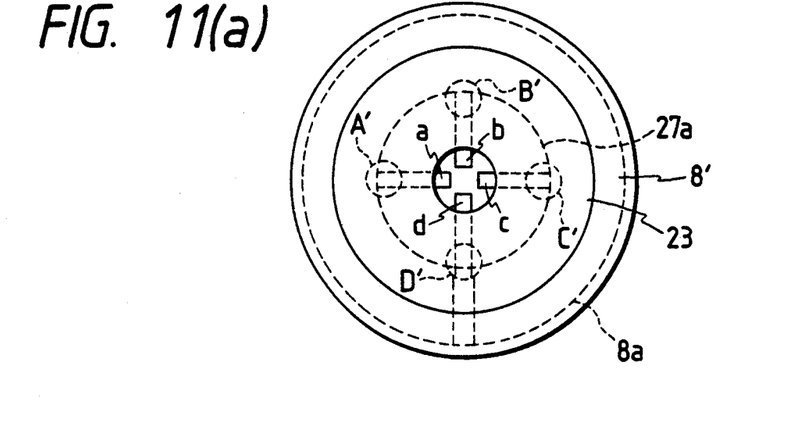
FIG. 11 is cross-sectional views of parts of the device along XI—XI line in FIG. 10 which correspond to the first, second and third distributors of the devices shown in FIGS. 1, 2, 3, 4, 5 and 6.
Figure 11B:
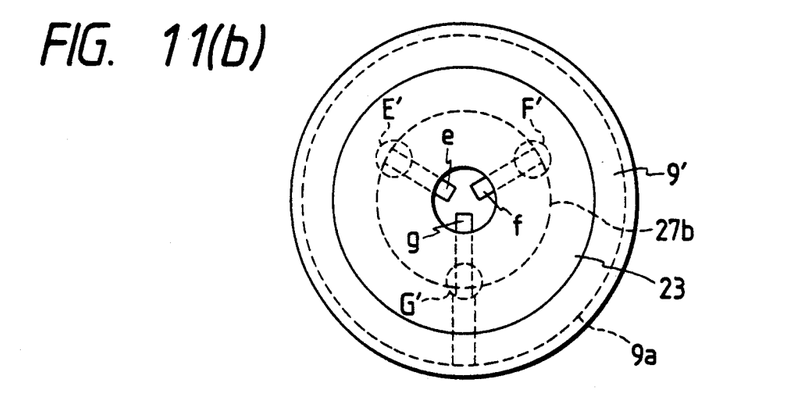
Figure 11C:
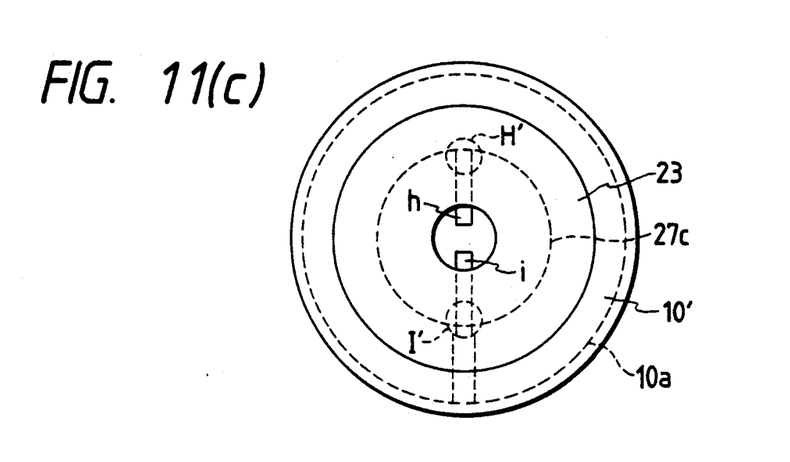

The distribution piece 27a corresponding to the first distributor 8 has four oblique grooves a, b, c and d extending obliquely to the axis of the piece and located at equal intervals along the circumference of the piece, as shown at (a) in FIG. 11. The other distribution piece 27b corresponding to the second distributor 9 has three oblique grooves e, f and g extending obliquely to the axis of the piece and located at equal intervals along the circumference of the piece, as shown at (b) in FIG. 11. The yet other distribution piece 27c corresponding to the third distributor 10 has two oblique grooves h and i extending obliquely to the axis of the piece and located at equal intervals along the circumference of the piece, as shown at (c) in FIG. 11.

The distribution blocks 8', 9' and 10' are nearly the same in constitution as the distributors 8, 9 and 10, and have four holes A', B', C' and D' and a circumferential groove 8a ,three holes E', F' and G' and a circumferential groove 9a, and two holes H' and I' and a circumferential groove 10a, respectively.

The oil feed passage block 24 directly connected to the down-stream end of each of the distribution blocks 8', 9' and 10' has a single hole for the confluence of the oil and the air which are passed downstream through the distribution block.

Since the oil and the air which are sent along the peripheral surfaces of the internal passages of the oil feed passage blocks 25 and 23 located at the oil and air inflow portion of the distribution unit 22 undergo turbulent flows at the downstream end of the internal passage of the passage block 23 or at the upstream end of the distribution piece 27a, 27b or 27c so that the oil and the air are dispersed in very numerous directions along the circumference of the internal passage, the oil and the air almost uniformly flow into the oblique grooves a, b, c and d of the distribution piece 27a, those e, f and g of the other distribution piece 27b, or those h and i of the yet other distribution piece 27c so that the oil and the air are uniformly introduced into the distribution block 8', 9' or 10'.

An orifice 28 may be provided halfway in the internal passage of the oil feed passage block 23 upstream of the distribution block 8', 9' or 10', as shown by a dotted line in FIG. 10, to reduce the cross-sectional area of the passage for the oil and the air so as to heighten the velocity of the flow of them to promote the above-mentioned dispersion of the oil and the air at the upstream end of the distribution piece 27a, 27b or 27b. Therefore, the orifice will be useful to uniformize the inflow quantities of the oil and the air to the oblique grooves of the distribution piece. Besides, the cross-sectional areas of the oblique grooves of the distribution piece and those of the holes of the distribution block may be appropriately preset to predetermine the divided quantities and passed quantities of the oil and the air.

An oil and air lubrication device provided in accordance with the present invention has such a simple construction that a distribution means is only provided in a single oil feed passage line. Even if an oil which is fed by the device is high in viscosity, required quantities of the oil separately flow into the single introducing passage of the distribution means and at least one passing passage thereof so that the adequate quantity of the oil is fed to a lubrication point through the introducing passage. For these reasons, the oil and air lubrication device is low in cost, capable of distribution in accurate quantities, and high in reliability. 4.

Shown in the drawings are a four-train conical roller bearing 3, contact-type oil seals 5 and 6, an oil feed passage 7, a first distributor 8, a second distributor 9, a third distributor 10, a first branch passage 11, a second branch passage 12, a third branch passage 13, a fourth branch passage 14, the passing holes A, B and C of the first distributor, the introducing hole D of the first distributor, the passing holes E and F of the second distributor, the introducing hole G of the second distributor, the passing hole H of the third distributor, and the introducing hole I of the third distributor.

While the present invention has been described above with respect to a single preferred embodiment thereof, it should of course be understood that the present invention should not be limited only to this embodiment but various change or modification may be made without departure from the scope of the present invention as defined by the appended claims.

What is claimed is:

1. An oil and air lubrication device for distributing an oil to a plurality of lubrication points through a plurality of branch passages as said oil is sent by an oil supplying means from an oil source along a peripheral surface of a single oil feed passage line, comprising:

at least one distribution means for sending required quantities of said oil to said lubrication points, said distribution means being provided in said oil feed passage line, each of said at least one distribution means having an introducing passage for sending said required quantity of said oil to said lubrication point via branch passages and at least one passing passage for passing another required quantity of said oil to a next down-stream distribution means; and an equalizing means, provided in said oil feed passage line at inlet ends of said distribution means, for equalizing the inflow quantities of said oil between said introducing passage and said passing passages.

2. An oil and air lubrication device according to claim 1, wherein said equalizing means comprises a distribution piece having a plurality of oblique grooves extending obliquely to an axis of the piece and located at equal intervals along a circumference of said piece.

* * * * *